Figure 1:
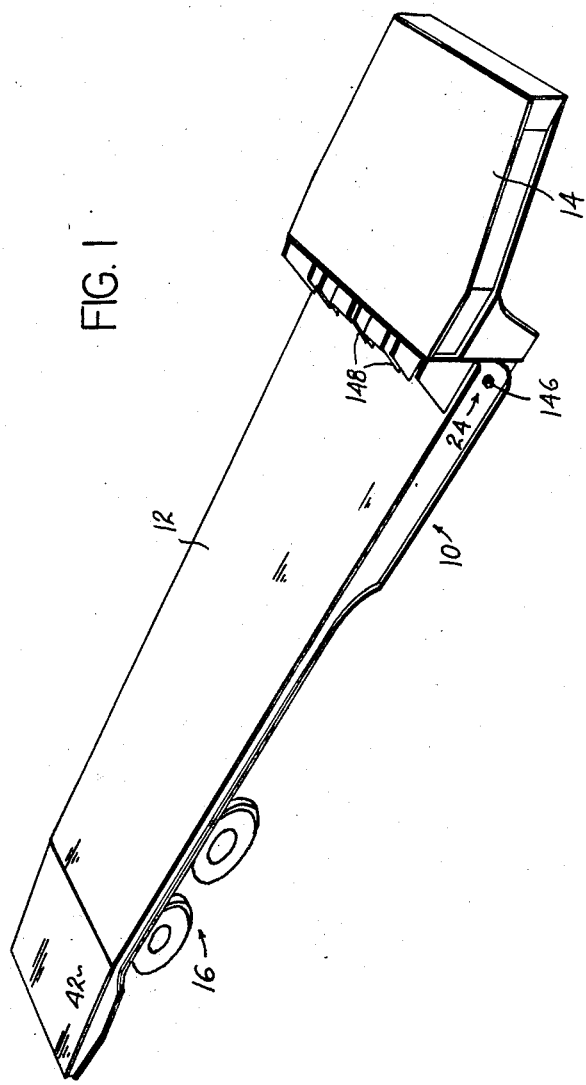

April 23, 1957 J. H. NORRIS 2,789,714
HEAVY DUTY GOOSENECK TRAILER
Filed Aug. 11, 1954 7 Sheets-Sheet 1

INVENTOR
JOSEPH H. NORRIS
BY *Talbert Dick & Adler*
ATTORNEYS

April 23, 1957  J. H. NORRIS  2,789,714
HEAVY DUTY GOOSENECK TRAILER
Filed Aug. 11, 1954  7 Sheets-Sheet 2

INVENTOR
JOSEPH H. NORRIS
BY Talbert Dick & Adler
ATTORNEYS

April 23, 1957 J. H. NORRIS 2,789,714
HEAVY DUTY GOOSENECK TRAILER
Filed Aug. 11, 1954 7 Sheets-Sheet 3

INVENTOR
JOSEPH H. NORRIS
BY Talbert Dick & Adler
ATTORNEYS

April 23, 1957  J. H. NORRIS  2,789,714
HEAVY DUTY GOOSENECK TRAILER
Filed Aug. 11, 1954  7 Sheets-Sheet 4

INVENTOR
JOSEPH H. NORRIS
BY Talbert Dick & Adler
ATTORNEYS

April 23, 1957　　　　J. H. NORRIS　　　　2,789,714
HEAVY DUTY GOOSENECK TRAILER
Filed Aug. 11, 1954　　　　　　　　　　7 Sheets-Sheet 5
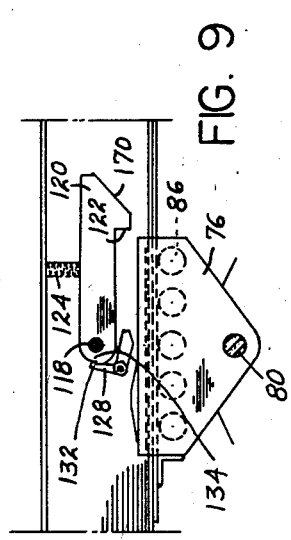
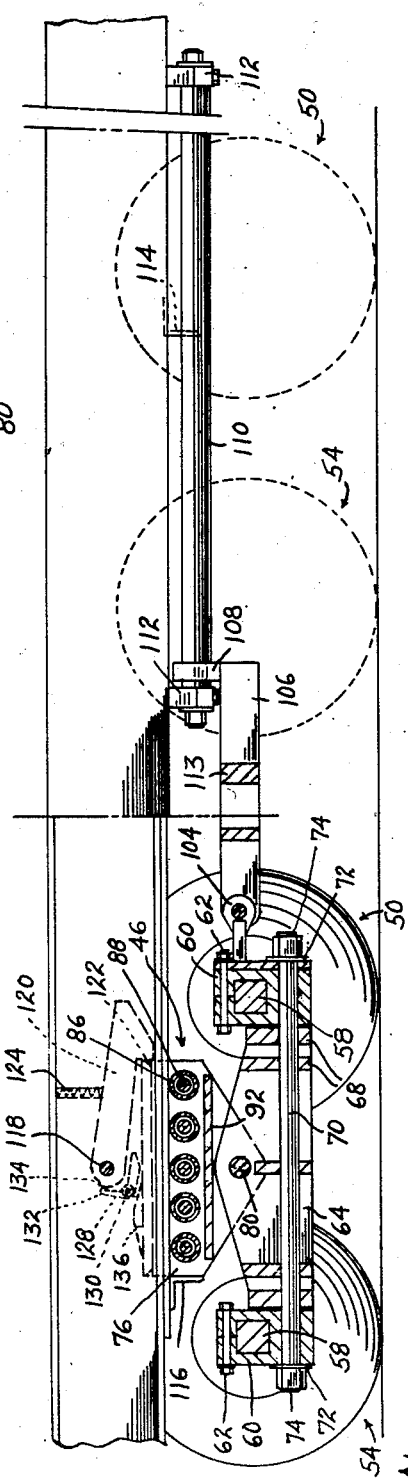
INVENTOR
JOSEPH H. NORRIS
BY
*Talbert Dick & Adler*
ATTORNEYS April 23, 1957    J. H. NORRIS    2,789,714
HEAVY DUTY GOOSENECK TRAILER
Filed Aug. 11, 1954    7 Sheets-Sheet 6

INVENTOR
JOSEPH H. NORRIS
BY *Talbert Dick & Adler*
ATTORNEYS

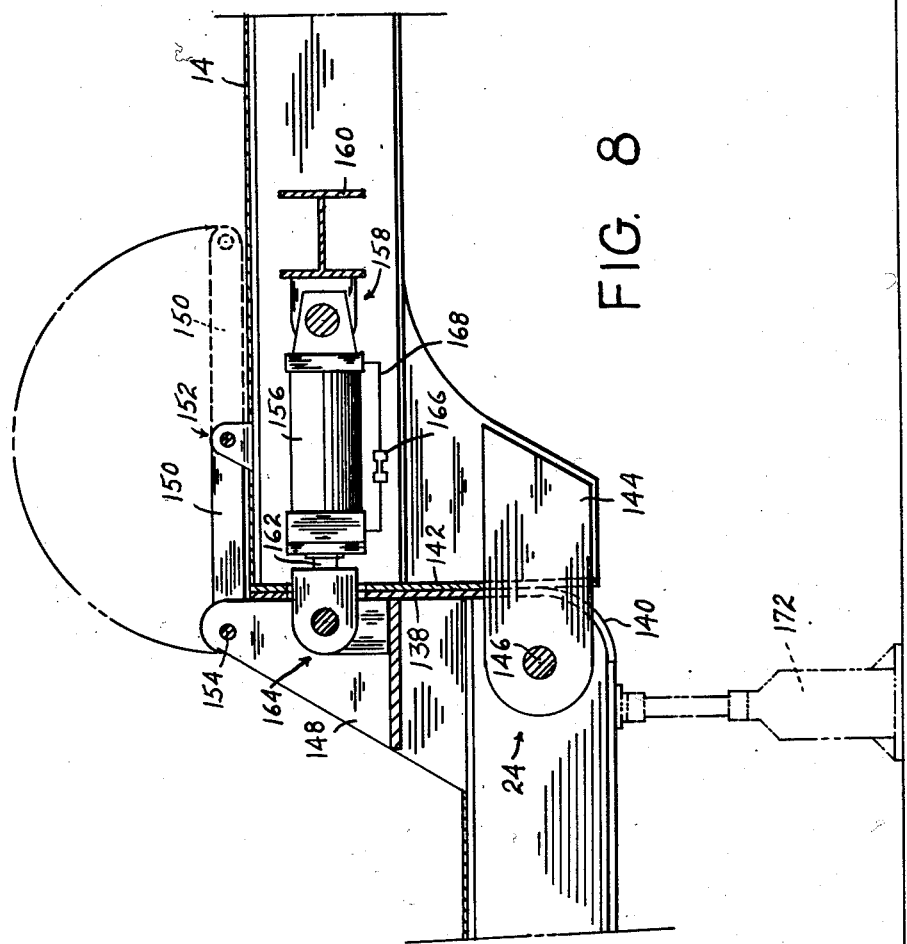

United States Patent Office 2,789,714
Patented Apr. 23, 1957

2,789,714

HEAVY DUTY GOOSENECK TRAILER

Joseph H. Norris, Des Moines, Iowa

Application August 11, 1954, Serial No. 449,163

14 Claims. (Cl. 214—506)

My invention relates to improvements in trailers preferably of the type used to carry equipment such as bulldozers and the like and more particularly this invention is designed to expedite and facilitate the loading and unloading of such equipment. It will be understood, however, that while I have preferably illustrated trailers with the carrying capacity for such heavy equipment, the principles here involved can be adapted for smaller units carrying lighter equipment that is similarly loaded and unloaded such as boat trailers and the like without departing from the disclosures as will be apparent hereinafter.

The matter of loading a heavy tracked piece of equipment such as a bulldozer, crane, or the like is something that must be executed very carefully and as presently done is not only time consuming but usually requires several persons. In this connection some trailers or flat beds are formed with ramps at the rear that may or may not be detachable. If they are detachable, the pieces are very heavy and require two or more persons for manhandling each time they are positioned for walking the equipment on or off the trailer and each time they are removed for travel of the trailer. When they are not removable, they will terminate close to the ground but obviously must leave sufficient clearance for travel and for this purpose may even be hinged so as to be movable upwardly for such travel. In either case, beams, usually of wood, are required to close the gap between the ground and the bottom of the ramp to provide a step, as it were, for obvious reasons. In view of the arduous task which such loading entails and because of the manpower and time required, the most practical and economical use of the equipment involved is not always accomplished. This is true in construction work where the owner of several pieces of equipment may have jobs going at different sites that are widely separated. Not always is the right unit where it is most needed at the right time and yet the circumstances may not justify releasing several of the personnel for the time required to bring a particular rig from another site, even though the rig, if present or if obtainable quickly and with little cost, could be used to good advantage.

With these observations in mind it is the general aim of my invention to provide a trailer for carrying equipment of the type that is wheeled, slid or walked onto and off of the same from the rear that can be quickly and easily positioned by one person for the loading or unloading of such equipment.

More particularly it is an object of this invention to provide a novel wheel assembly at the rear of a trailer of the above class whereby the wheels can be locked and the trailer bed slidably moved thereover until it tilts with one end resting on the ground to serve as a ramp upon which a piece of equipment can be pushed, driven or otherwise maneuvered thereon.

Another object of this invention is to employ the use of a bogey suspension for the rear wheel assembly of my new trailer.

Since the trailers with which my invention is primarily concerned will usually be of the type having rear wheels only and a gooseneck structure at the front attachable to the fifth wheel on a prime mover, it is another important object of my invention to provide a hinged or pivotal connection between the flat bed or deck portion of the trailer and the gooseneck portion thereof so that the tilting of the trailer bed as hereinabove described can be accomplished with the gooseneck attached to the prime mover.

A still further object of this invention is to provide with a tiltable trailer structure as above characterized, a suitable yielding means to cushion the movement of the trailer bed when tilting or returning to its normal position in order to reduce and minimize any jarring to equipment being loaded or unloaded.

Other objects of this invention are to provide a trailer of the above class that is economical in manufacture, durable in construction and extremely efficient for accomplishing its intended purpose.

These and other objects will be apparent to those skilled in the art.

Figure 2:
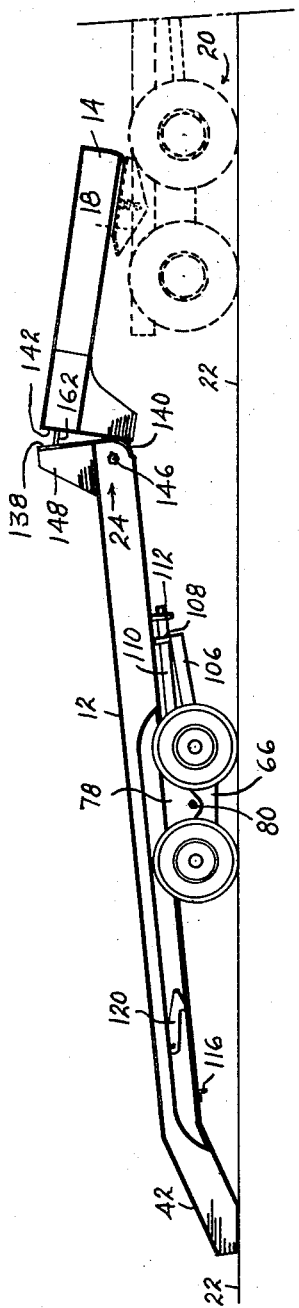
Figure 3:
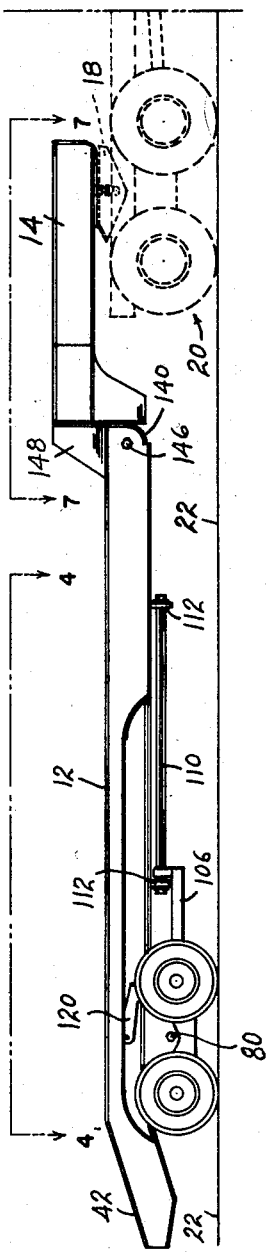
Figure 4:
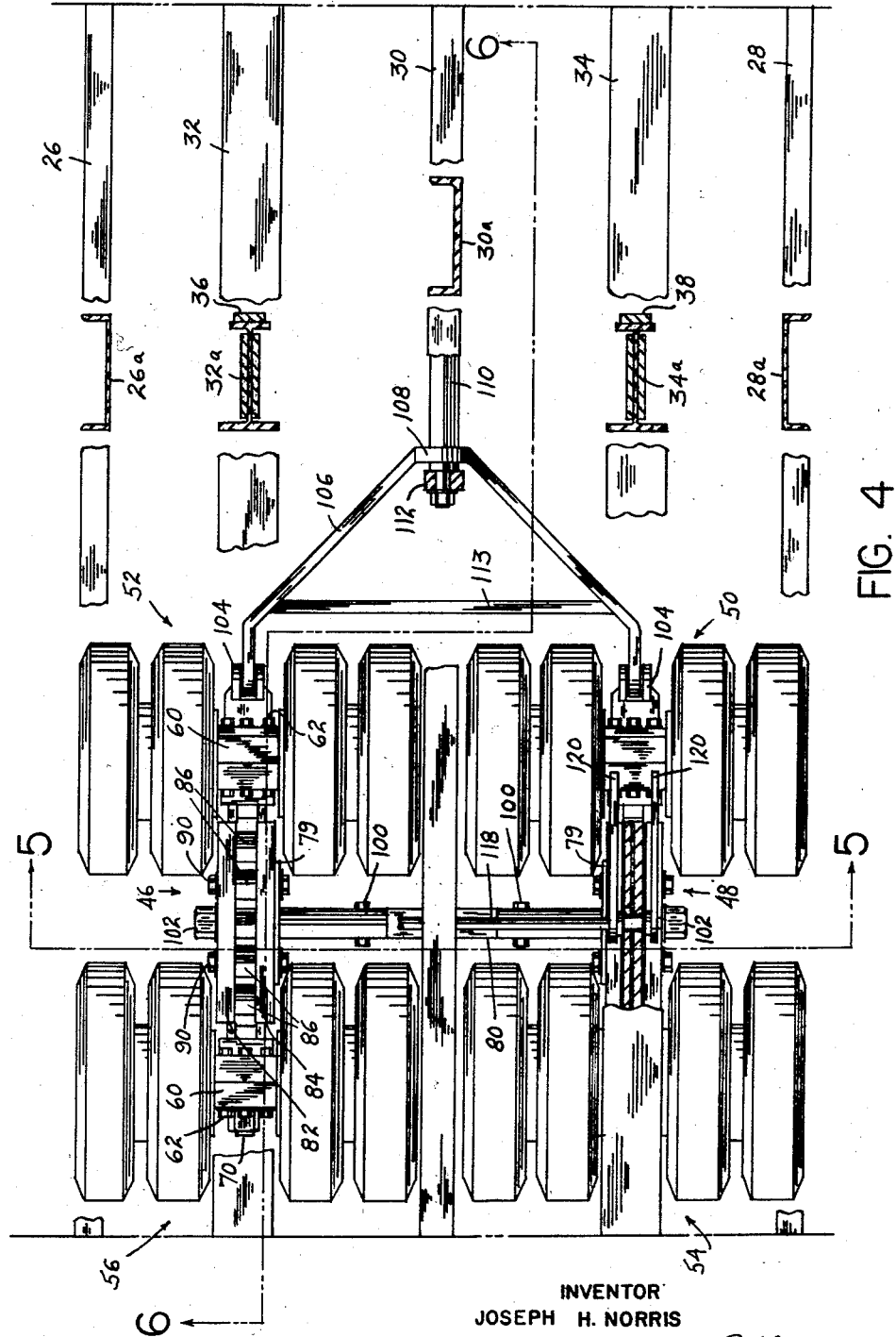
Figure 5:
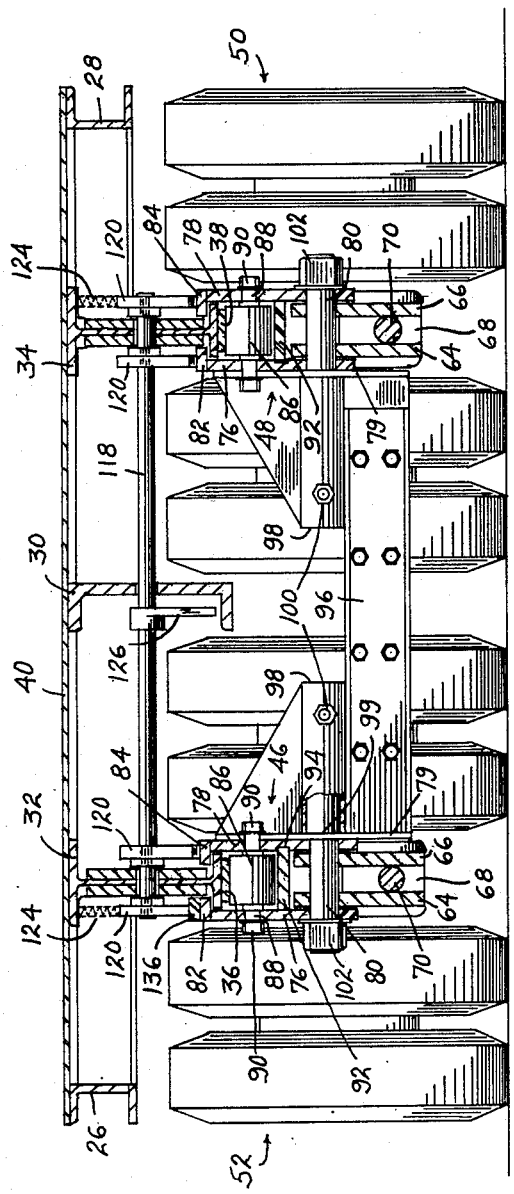

My invention consists in the construction, arrangement, and combination of the various parts of the device, whereby the objects contemplated are attained as hereinafter more fully set forth, specifically pointed out in my claims, and illustrated in the accompanying drawings in which:

Fig. 1 is a perspective view of a trailer illustrating the preferred trailer structure for which my invention is more particularly adapted, Fig. 2 is a side elevational view of my new trailer shown in position to load or unload a piece of equipment such as a bulldozer or the like, Fig. 3 is a side elevational view of this trailer in position for road travel, Fig. 4 is an enlarged view taken from the line 4—4 of Fig. 3 with the trailer bed removed to expose the wheel assembly which is partly in section. Also in this view the frame structure below the trailer bed is indicated and as seen at the right of this figure, cross sectional inserts of the various beams in the frame structure are placed so as to more fully illustrate the construction thereof, Fig. 5 is a cross sectional view taken on the line 5—5 of Fig. 4 to show particularly the bogey suspension and roller members associated therewith, Fig. 6 is a cross sectional view of this trailer taken from the line 6—6 of Fig. 4, Fig. 7 is a top plan view of this trailer taken from the line 7—7 of Fig. 2 with portions cut away to more fully illustrate the construction thereat.

Figure 7:
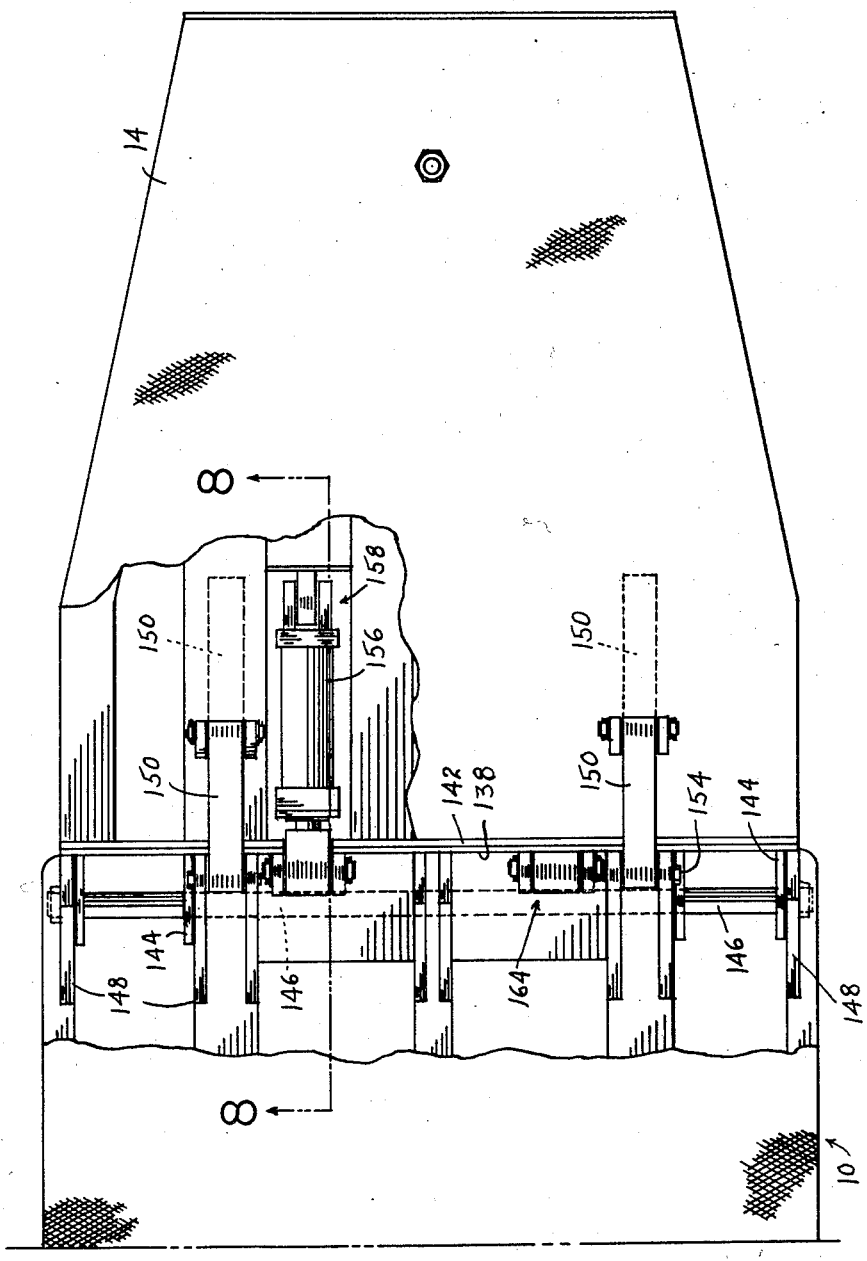

Fig. 8 is a cross sectional view of the pivotal connection between the trailer deck and the gooseneck and showing the hydraulic cylinder associated therewith and is taken on the line 8—8 of Fig. 7, and Fig. 9 is an enlarged elevational view of the dog member assembly which appears in operable position in dotted lines in Fig. 6 and which is here shown in inoperable position.

Referring to the drawings I have shown in Fig. 1 a perspective view of the type of trailer which is preferably adaptable for use with my invention. Such trailers consist generally of the frame 10, bed 12, gooseneck 14 and wheel assembly 16, and will be attached to the fifth wheel 18 on a prime mover, indicated generally at 20 (Fig. 3) in a manner well known in the art. No invention is claimed in such trailer parts per se, but as will become apparent from the description which follows I have made novel and material changes in the wheel assembly structure and in certain respects to the trailer frame itself which materially improves the utility and efficiency of such trailers relative to the loading and unloading of equipment. In general this involves the slidable mounting of wheel assembly 16 on track means associated with the frame 10 so that the wheels can be locked and the frame 10 moved rearwardly by the tractor 20 or the like until the rear of the bed 12 tilts by gravity to contact the ground 22 as shown in Fig. 2. A pivotal connection designated generally as 24 (Figs. 2 and 8) between frame 10 and the gooseneck 14 facilitates such tilting and varies from the present trailer structure wherein the frame and gooseneck are usually integrally formed. Having thus generally pointed out the novel aspects of this invention I shall now describe in detail the structure which accomplishes the objectives enumerated.

The trailer frame 10 will be suitably formed to carry designated loads and in this respect it will be appreciated that the size and strength of frame members can be varied according to particular specifications. For purposes of illustrating one form of frame structure, however, reference is had more particularly to Fig. 4. Here I have used the beams 26 and 28 as the respective side members of my frame structure together with beam 30 centrally positioned between beams 26 and 28. Beams 26, 28 and 30 are channel shaped in cross section as indicated by the sectional inserts 26a, 28a and 30a, are substantially of like size and are disposed in spaced parallel relationship longitudinally of the trailer as shown. Intermediate beams 26 and 30 and in parallel spaced relationship thereto is placed the reinforced I beam 32 and a like beam 34 is similarly placed between beams 30 and 28. Beams 32 and 34 are similar in structure as is apparent from the sectional inserts 32a and 34a. It is pointed out relative to the sectional inserts in Fig. 4 that the top and bottom flange portions of the several beams are at the left and right sides respectively as viewed and to the bottom flange of beams 32 and 34 there is secured the respective spacer bars 36 and 38. All beams 26, 28, 30, 32 and 34 are connected to the gooseneck 14 by the pivotal connection 24 (Fig. 8) as will later be described in detail, and across the top flanges of the beams is suitably mounted the bed, plate or deck member 40 (Fig. 5). Other braces for making the frame more rigid may of course be employed in manners well known in the art and at the trailing or rearward end of the frame structure I have provided a slight downward ramp-like incline indicated generally by the numeral 42 which is adequately spaced from the ground level 22 to afford ample clearance for road travel.

It will be appreciated from the description above of my trailer frame, that the type of trailer to which I preferably adapt my invention is one for carrying what is known in the construction field as heavy equipment and therefore as shown in Fig. 4 I have illustrated a sixteen wheel assembly 16 for sustaining such loads. However, it is not my intention to limit the application of this invention to trailers of this capacity as it can also be used on lighter rigs such as eight, four or two wheel units or on heavier units without departing from the principles involved.

With reference now more particularly to Figs. 4, 5 and 6 I have employed two bogey suspensions and roller assemblies indicated generally by the numerals 46 and 48. These assemblies 46 and 48 are of like structure and like numbers will thus be given to like parts. They provide for the sliding relationship between the trailer frame and wheel assembly as pointed out previously and the use of two such assemblies is here shown to provide a balancing factor in insuring proper movement of the sixteen wheels without any lateral twist or bending. Both assemblies 46 and 48 perform a like function as will later appear and if used on a lighter trailer with fewer wheels, one such assembly will in some instances be adequate.

In view of the use of sixteen wheels as shown in two rows of eight, it is pointed out that in each row, four wheels are assembled as a unit so that the four such units are indicated generally at 50 and 52 for the front row and 54 and 56 for the rear row to facilitate understanding the following description. Each respective set of wheels 50, 52, 54 and 56 is mounted on a common axle which is not shown in detail since its construction and arrangement is well known in the art and each axle at a point in a vertical plane with the respective beams 32 and 34 is square in cross section as shown by the numeral 58 in Fig. 6. An axle bracket 60 is secured to the square portion 58 of each axle (Fig. 6) and preferably is split in its upper portion to facilitate mounting and removal and to afford means for tightening about portion 58. A bore is formed in bracket 60 complementary in shape with axle portion 58 for securely engaging the same as shown and bolts 62 or the like are used to secure the split end of bracket 60 in place.

Thus far described it will be understood that axle brackets 60 on the respective wheel units 50 and 54 are in alignment relative to the direction of travel of the trailer and the same is true of these brackets relative to the wheel units 52 and 56. Bogey assembly 48 is operatively associated with wheel units 50 and 54 and assembly 46 is likewise associated with units 52 and 56. I shall direct my description of the bogey and roller structure to assembly 46 as a matter of convenience since assembly 48 is identical therewith. A pair of rocking plates 64 and 66 (Figs. 5 and 6) are disposed in parallel relationship and extend between and at their respective ends bear against the axle brackets 60. The upper edges of these plates incline from each end to an apex at their longitudinal center (Fig. 6) to provide a pivotal connecting point with an upper plate as will later appear. Transversely of plates 64 and 66 and in spaced relationship longitudinally thereof are placed a plurality of integral spacer and stiffener members 68, and a tie rod or bolt 70 extends through both axle brackets 60 and all spacers 68. Rod 70 is secured to the opposite outermost sides of axle brackets 60 by a suitable washer 72 and nut 74 and thus clamps plates 64 and 66 therebetween in such a manner as to admit of a lateral rocking or rotatable movement on pin 70 between the bearing surfaces between plates 64 and 66 and axle brackets 60 as described. This constitutes the lower part of my bogey suspension and the upper part which includes the roller assembly is constructed as follows.

A pair of like plates 76 and 78 disposed in parallel spaced relationship have their lower edges inclined downwardly from each end to provide an inverted apex portion that overlaps with the apex portion of the lower plates 64 and 66 (Fig. 6) where the latter are pivotally connected by a pin or shaft 80 which will later be described more in detail. On the upper edge of each plate 76 and 78 there is integrally formed the inwardly extending shoulders 82 and 84 respectively (Fig. 5) that overlap the respective sides of the bottom flange of beam 32 and where beam 32 is here designated it will be understood that beam 34 serves a like purpose for assembly 48. Shoulders 82 and 84 are normally spaced slightly above the bottom flange of beam 32 by means as will later appear and in the position as shown they serve as a stop or guard against the entire assembly 46 being dislodged from the trailer frame due to bumping or jarring.

Between the upper portion of plates 76 and 78 I have mounted in spaced relationship from the front to the rear thereof a plurality of rollers 86 which as shown in Fig. 6 are five in number but which of course may be more or less as may be required for efficient operation by the size of the wheel units associated therewith. Each roller 86 revolves in the direction of movement of the trailer and rides against the underside of bar 36 (bar 38 for assembly 48) as shown in Fig. 5. It will of course be understood that each roller 86 is mounted on a shaft or axle 88 and in this respect I have provided the following arrangement to facilitate assembly and disassembly in case of repairs or the like. With reference to Fig. 6 where rollers 86 are shown in section, the shafts 88 on the two end rollers and the middle one are merely disposed in holes bored in plates 76 and 78. On the other two rollers, being the second and fourth from left to right, the shafts 88 are in the form of assembly pins that extend through plates 76, 78 and 79 and are secured by nuts 90 as shown in Fig. 5. Plates 79 are oppositely disposed between assemblies 46 and 48 and one such plate is secured to the inner side of plate 78 on assembly 46 with the other like plate similarly arranged on the inner side of plate 76 on assembly 48. Thus, by tightening nuts 90, plates 76 and 78 are pressed together to adequately hold the other rollers in place. A spacer member such as a bar or plate 92, disposed in spaced relationship below rollers 86 is parallel to bar 36 (and 38) and is secured as by welding or the like to plate 76 and extends to plate 78 where its registers with a slot 94 therein. It is held in place by the pressing action of the assembly pins formed by shaft 88 and nut 90 and by pin 80 and is easily removed from such slot when such pins are removed.

Plates 79 as above described are connected by suitable brackets or beams 96 (Fig. 5). At each end of bracket 96 there is mounted a tubing 98 designed to receive the pin 80 which holds the upper and lower bogey plates together as previously described. Pin 80 has a shoulder 99 which bears against plate 79 and thus it will be understood that pin 80 is inserted into tubing 98 from the end farthest from plate 79 and then through the overlapping apex portions of plates 64, 66, 76 and 78. A bolt 100 is secured transversely of tube 98 and pin 80 when mounted therein and in this way, tightening of nut 102 on pin 80 will pull the shoulder on pin 80 against plate 79 and the connection can be made secure. Plates 64 and 66 are thus susceptible of rocking on pin 80 longitudinally of the trailer frame and with the lateral rocking of those plates on pin 70 as previously described it will be appreciated that each set of dual wheels on the wheel units 50, 52, 54 and 56 are rockable in four directions to take any bumps or depressions in the road and minimize any jarring of the equipment carried on the trailer. Thus far described, it will be appreciated that wheel units 50 and 54, and 52 and 56 are capable of slidable movement along the respective beams 34 and 32 to change the position of the wheels relative to the trailer frame. However, certain guide, stop, and control elements are provided to regulate such movement and these are adapted as follows.

To the forward side of each axle bracket 60 on the forwardmost wheel units 50 and 52 there is secured a pair of projecting spaced ears or what I call a shackle 104 (Figs. 4 and 6) for pivotally receiving the ends of diverging arms on a yoke 106. An eye portion or collar 108 at the neck of yoke 106 is mounted for slidable movement on a guide rod 110 suitably secured to spaced brackets 112 depending from beam 30 as shown in Figs. 4 and 6. Guide rod 110 is placed longitudinally of beam 30 and being intermediate beams 32 and 34 on which assemblies 46 and 48 move, it serves to keep those assemblies from any lateral twist or binding as they move longitudinally of the trailer frame. On a smaller trailer, however, with only one such bogey suspension and roller assembly, it will be understood that a single arm in place of a yoke can be satisfactorily used. Suitable cross braces 113 are preferably employed to strengthen the arms of yoke 106. To limit the travel of assemblies 46 and 48, a forward stop member 114 depends from the underside of the forward portion of beams 32 and 34 and is engaged by the forward edges of plates 76 and 78, and a similar stop 116 located at the rearward portions of these beams is engageable by the rear edges of such plates.

Assemblies 46 and 48 are maintained against accidental slidable movement by controllable dogs for which reference is had more particularly to Figs. 4, 5 and 6. Transversely of the longitudinal axis of the trailer an operating rod or shaft 118 is rotatably journalled through the trailer frame shown here as through beams 32, 30 and 34 and substantially in the same vertical plane as rod 80 or otherwise suitably positioned transversely of the respective assemblies 46 and 48. To this rod 118 I have secured for rotation therewith a plurality of dogs 120, with one such dog disposed over each top flange 82 and 84 of the plates 76 and 78. Each dog 120 has the forward shoulder 122 which normally engages the forward edge of the respective plates 76 and 78 (Fig. 6) to hold it against forward movement. In this position, assemblies 46 and 48 will be abutting the rear stop 116 so that the dogs maintain it in this position for road travel. Springs 124 extending between the dogs and trailer frame yieldingly hold the dogs in their downward position for engagement with assemblies 46 and 48 as described. A lever, or other suitable means 126 (Fig. 5) for rotating rod 118 extends to any desired place on the trailer or may be adapted for operation in the cab of a tractor. Thus, by movement of this lever 126 rod 118 is rotated toward the rear which elevates the forward end of each dog 120 since they are all secured to rod 118 and thereby releases shoulders 122 from assemblies 46 and 48. At the rear of one of the dogs 120 an L-shaped locking lug 128 is pivotally secured by a pin 130 at its heel point to the trailer frame. Lug 128 has a claw or pawl 132 at the top of its upstanding arm for engagement with shoulder 134 on the rear of the adjacent dog 120. This contact occurs as shoulder 122 is released, is maintained only momentarily as will later appear, and since all dogs 120 are secured to rod 118, holds all dogs in their elevated position against spring 124. The lower arm of lug 128 extends forwardly of pin 130 and is weighted to normally move pawl 132 forwardly for engagement with shoulder 134 as described. For releasing pawl 132 from the dog, a cam 136 is placed on the shoulder of plate 82 (Figs. 5 and 6) over which the lower arm of lug 128 rides from rear to front as will be explained more in detail later, and thus elevates this arm portion to move pawl 132 rearwardly off of shoulder 134 so that dogs 120 are returned to their lowermost position by springs 124.

With reference now to Figs. 7 and 8 I shall describe the arrangement between the forward end of the trailer frame 10 and the gooseneck 14 by which the action shown in Fig. 2 is permitted. An upstanding plate 138 is secured across the front of frame 10 and has the curved surface or radius 140 at its lower end as shown. In road travel position it abuts a rear plate 142 on gooseneck 14 and frame 10 is pivotally attached at point 24 to ears 144 on the lower rearward portion of gooseneck 14 by a pin 146 which extends transversely of the trailer sides. Pin 146 also passes through a plurality of spaced web like braces 148 that extend between the trailer bed 12 and the rearward side of plate 138. For securing the trailer and gooseneck against accidental movement as shown in Fig. 2 I provide a pair of spaced latch members 150 pivotally secured at one end 152 to the top of the gooseneck so as to be movable across the top of plate 138 where it can be detachably secured between two adjacent braces 148 by a pin 154. This is shown in solid lines in Figs. 7 and 8 and the dotted line position for latch 150 indicates its position when not in use. Extending between the front of the trailer and the rear of the gooseneck I have placed a pair of high pressure hydraulic cylinders 156 to cushion the movement of the trailer against jars. This is done by pivotally connecting one end of cylinder 156 in any suitable manner as indicated at 158 to the frame structure 160 of the gooseneck 14 and similarly connecting the other end, being the end of the plunger rod 162, to a suitable support means 164 between any adjacent braces 148. A restricted orifice 166 is placed in the fluid line 168 to assure a gradual movement of plunger rod 162.

Thus constructed and arranged, this invention will operate in the following manner. In Fig. 3 there is represented my trailer attached to a tractor 20 and in position for road travel. The bogey suspensions and roller assemblies 46 and 48 are in the rearward position abutting the rear stops 116 and the dogs 120 are engaging the front of these assemblies as shown in Fig. 6. To change this position to that shown in Fig. 2 the brakes on the trailer wheels are locked, and while I have not described such brakes, as no invention is claimed therein, it will be understood that my trailer is equipped with suitable brakes as is well known in the art. Once the brakes are set or locked, lever 126 is manipulated to elevate the dogs 120, latches 150 are removed, and by backing the tractor 20, the trailer frame is in effect moved over the roller assemblies 46 and 48 by plates 36 and 38 moving on the respective rollers 86 until the forward stop 114 engages the assemblies 46 and 48. As the trailer bed projects beyond the wheels to the rear, end 42 will be lowered by gravity to the ground. At the same time at the forward end of the trailer the plates 138 and 142 will move apart as shown so that the entire trailer bed is inclined to the ground in such a position that a bulldozer or the like can be walked or otherwise maneuvered thereon. As such equipment is moved onto the trailer and approaches the front thereof, its weight would have a tendency to slam plates 138 and 142 together but such action is prevented by the arrangement of the cylinders 156. As soon as the trailer bed and gooseneck have returned to the position in Fig. 3, latches 150 are secured and with the brakes still set, the tractor is pulled forwardly where assemblies 46 and 48 are automatically locked in position for road travel. Such locking is due to the cooperation between the dogs 120 and lug 128 as follows: When lever 126 is initially operated to elevate the dogs 120, claw or pawl 132 immediately engages shoulder 134 to hold the dogs out of engagement since its weighted lower end brings pawl 132 forwardly. This position is maintained only momentarily, that is, long enough for the forward end of assemblies 46 and 38 to clear shoulder 122 as the trailer is backed. As soon as such clearance is effected, the lower arm of lug 128 will ride over the cam 136 toward the rear of the trailer which elevates it and obviously moves pawl 132 rearwardly out of engagement with shoulder 122. Springs 124 then urge the forward end of dogs 120 downwardly below the plane of the upper edge of assemblies 46 and 48 in position preparatory for locking these assemblies when the trailer is pulled forwardly with the brakes still set. The leading edge of the dogs 120 is inclined as shown at 170 so that when the trailer is pulled forwardly, these dogs can ride up and on plates 76 and 78 until they clear the forward end and snap into their original locking position with assemblies 46 and 48 abutting the rear stops 116.

It is pointed out that once lever 126 is manually manipulated, no further attention is required for my assemblies 46 and 48. The limit of travel of the trailer bed, and the locking and unlocking of the dogs are all automatic so that one person capable of driving the tractor and the equipment to be loaded can easily perform the operation described. It should also be mentioned that when the trailer is disengaged from a tractor or the like a jack means 172 either as a separate unit or trailer mounted will be used for support at the front end of the trailer as shown and also latches 150 will be secured to keep the gooseneck from dropping.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my trailer without departing from the real spirit and purpose of my invention, and it is my intention to cover by my claims, any modified forms of structure or use of mechanical equivalents which may be reasonably included within their scope.

I claim:
1. In a trailer, a frame having a forward and rear end portion respectively and designed at its forward end for detachable connection to a prime mover such as a tractor or the like, a wheel assembly slidably mounted to the underside of said frame so that said frame is movable in relation thereto along its longitudinal axis, a guide rod depending from said frame, means slidable on said guide rod and connected to said wheel assembly, said wheel assembly having a fixed traveling position at the rear end portion of said trailer for road travel, control means on said frame to hold it against movement relative to said wheel assembly when such assembly is in its traveling position, and stop means on each respective end portion of said frame engageable respectively with said wheel assembly to limit the movement of said frame relative thereto in two opposite directions respectively.

2. In a trailer, a frame designed at its forward end for detachable connection to a prime mover such as a tractor or the like, a roller assembly slidably mounted to the underside of said frame so that said frame is movable in relation thereto along its longitudinal axis, a bogey suspension assembly connected to said roller assembly, a wheel unit mounted to said bogey suspension assembly, and control means on said frame to hold it against movement relative to said roller assembly at times.

3. In a trailer, a frame having a forward and rear end portion respectively and designed at its forward end for detachable pivotal connection to a prime mover such as a tractor or the like, a wheel assembly slidably mounted to the underside of said frame so that said frame is movable in relation thereto along its longitudinal axis, brake means operatively associated with said wheel assembly, said wheel assembly having a fixed traveling position at the rear end portion of said trailer for road travel, said frame when said brake means are set to hold said wheel assembly movable rearwardly past said wheel assembly to a tilting point whereby the rear frame end tilts by gravity and engages the ground to provide a ramp-like incline onto which a piece of equipment such as a bulldozer or the like can be maneuvered for positioning on said frame, and control means on said frame to hold it against movement relative to said wheel assembly when such assembly is in its traveling position.

4. In a trailer, a frame having a forward and rear end portion respectively and designed at its forward end for detachable pivotal connection to a prime mover such as a tractor or the like, a wheel assembly slidably mounted to the underside of said frame so that said frame is movable in relation thereto along its longitudinal axis, a guide rod depending from said frame, means slidable on said guide rod and connected to said wheel assembly, said wheel assembly having a single fixable position at the rear end portion of said trailer for road travel, said frame when said brake means are set to hold said wheel assembly movable rearwardly past said wheel assembly to a tilting point whereby the rear frame end tilts by gravity and engages the ground to provide a ramp-like incline onto which a piece of equipment such as a bulldozer or the like can be maneuvered for positioning on said frame, and control means on said frame to hold it against movement relative to said wheel assembly when such assembly is in its traveling position.

5. In a trailer, a frame having a forward and rear end portion respectively, a gooseneck normally abutting the forward end of said frame and pivotally connected thereto, said gooseneck designed for detachable connection to a prime mover such as a tractor or the like, a wheel assembly slidably mounted to the underside of said frame so that said frame is movable in relation thereto along its longitudinal axis, means for locking said wheel assembly against movement relative to the ground, said frame capable of being moved rearwardly over said wheel assembly when locked to a tilting point whereby the rear end of said frame tilts by gravity and engages the ground and the forward end diverges from said gooseneck at the pivotal connection therebetween, yielding means between the forward end of said trailer and said gooseneck to cushion the movement relative thereto, and control means on said frame to hold it against movement relative to said wheel assembly at times.

6. In a trailer, a frame having a forward and rear end portion respectively, a gooseneck normally abutting the forward end of said frame and pivotally connected thereto, said gooseneck designed for detachable connection to a prime mover such as a tractor or the like, a wheel assembly slidably mounted to the underside of said frame so that said frame is movable in relation thereto along its longitudinal axis, means for locking said wheel assembly against movement relative to the ground, said frame capable of being moved rearwardly over said wheel assembly when locked to a tilting point whereby the rear end of said frame tilts by gravity and engages the ground and the forward end diverges from said gooseneck at the pivotal connection therebetween, said frame movable from its tilted position over said wheel assembly to its original position with the forward end returning to normal position relative to said gooseneck, yielding means between the forward end of said trailer and said gooseneck to cushion the movement relative thereto in two opposite directions respectively, and control means on said frame to hold it against movement relative to said wheel assembly at times.

7. A trailer as defined in claim 5 having lock means for securing the forward end of said trailer frame and said gooseneck against relative movement at times.

8. In a trailer, a frame having a forward and rear end portion respectively and designed at its forward end for detachable pivotal connection to a prime mover such as a tractor or the like, a wheel assembly slidably mounted to the underside of said frame so that said frame is movable in relation thereto along its longitudinal axis, brake means operatively associated with said wheel assembly, said wheel assembly having a fixed traveling position at the rear end portion of said trailer for road travel, said frame when said brake means are set to hold said wheel assembly movable rearwardly past said wheel assembly to a tilting point whereby the rear frame end tilts by gravity and engages the ground to provide a ramp-like incline onto which a piece of equipment such as a bulldozer or the like can be maneuvered for positioning on said frame, and when such equipment is so positioned said frame capable of being moved over said wheel assembly to return it to its traveling position, and a manually operable control means on said frame to hold it against movement relative to said wheel assembly when such assembly is in its traveling position.

9. In a trailer, a frame having a forward and rear end portion respectively and designed at its forward end for detachable pivotal connection to a prime mover such as a tractor or the like, a wheel assembly slidably mounted to the underside of said frame so that said frame is movable in relation thereto along its longitudinal axis between the rear and front ends thereof, a guide rod depending from said frame, means slidable on said guide rod and connected to said wheel assembly, said wheel assembly having a fixed traveling position at the rear end portion of said trailer for road travel, said frame when said brake means are set to hold said wheel assembly movable rearwardly past said wheel assembly to a tilting point whereby the rear frame end tilts by gravity and engages the ground to provide a ramp-like incline onto which a piece of equipment such as a bulldozer or the like can be maneuvered for positioning on said frame, control means on said frame to hold it against movement relative to said wheel assembly when such assembly is in its traveling position, and stop means on each respective end portion of said frame engageable respectively with said wheel assembly to define the limits of movement of said frame relative thereto in two opposite directions respectively.

10. In a trailer, a frame having a forward and rear end portion respectively, a gooseneck normally abutting the forward end of said frame and pivotally connected thereto, said gooseneck designed for detachable connection to a prime mover such as a tractor or the like, a wheel assembly slidably mounted to the underside of said frame so that said frame is movable in relation thereto along its longitudinal axis, said wheel assembly having a single fixed traveling position at the rear of said frame, means for locking said wheel assembly against movement relative to the ground, means for releasably locking said frame against movement relative to said wheel assembly when such assembly is in its traveling position, said frame capable of being moved rearwardly over said wheel assembly to a tilting point when such assembly is locked against movement relative to the ground whereby the rear end of said frame tilts by gravity and engages the ground and the forward end diverges from said gooseneck at the pivotal connection therebetween, and yielding means between said trailer and said gooseneck to cushion the movement relative thereto.

11. In a trailer, a load carrying frame having a forward and rear end respectively, a gooseneck pivotally connected to the forward end of said frame and designed for connection to a prime mover, a roller assembly slidably mounted to the underside of said frame so that said frame is movable in relation thereto along its longitudinal axis, a wheel assembly mounted to said roller assembly, means for locking said wheel assembly against movement relative to the ground, said wheel assembly having a fixed traveling position at the rear of said frame, said frame with said wheel assembly locked movable over said roller assembly to a point where said frame tilts by gravity so that the rear of said frame engages the ground for receiving a load and the forward end diverges from said gooseneck, said frame after receiving a load tiltable by the weight thereof to its original position relative to said gooseneck, said frame with a load thereon movable over said roller assembly to its original position, and lock means on said frame to hold it in its original position relative to said roller assembly.

12. A device as defined in claim 11 including yielding means connecting said gooseneck and said frame to cushion the diverging and converging movements relative thereto.

13. In a trailer, a load carrying frame having a front and rear end, a hitch mounted on the front end thereof for attachment to a prime mover, a wheel assembly slidably mounted to the underside of said frame, means for locking said wheel assembly relative to the ground, said wheel assembly having a single fixed traveling position at the rear of said frame, control means for locking said frame against movement relative to said wheel assembly while in traveling position, said control means being manually releasable and automatically resetting, said frame with said wheel assembly locked relative to the ground and said control means manually released movable over said wheel assembly to a point where said frame tilts by gravity so that the rear of said frame engages the ground for receiving a load, said frame with a load thereon tiltable by the weight thereof to its original non tilting position, said frame with a load thereon movable over said wheel assembly to its original position relative thereto where said control means automatically locks said frame and wheel assembly against relative movement.

14. A device as defined in claim 13 wherein said hitch comprises a gooseneck pivotally connected to the forward end of said frame so that said gooseneck and said frame diverge and converge respectively from said pivot point as said frame is tilted for receiving a load and returned to non tilting position, and yielding means connecting said gooseneck in said frame to cushion the diverging and converging movements relative thereto.

(References on following page)

References Cited in the file of this patent

UNITED STATES PATENTS

| | | |
|---|---|---|
| 2,415,706 | Ronk | Feb. 11, 1947 |
| 2,545,584 | Meadows | Mar. 20, 1951 |
| 2,590,210 | Rogers | Mar. 25, 1952 |
| 2,676,815 | Bennett | Apr. 27, 1954 |
| 2,687,225 | Martin | Aug. 24, 1954 |
| 2,717,707 | Martin | Sept. 13, 1955 |

FOREIGN PATENTS

| | | |
|---|---|---|
| 726,877 | France | Mar. 14, 1932 |
| 847,437 | France | July 3, 1939 |